(12) United States Patent
Ramesh et al.

(10) Patent No.: US 8,666,956 B1
(45) Date of Patent: Mar. 4, 2014

(54) SEQUENCED MODIFICATIONS OF MULTIPLE ROWS IN A TEMPORAL TABLE

(75) Inventors: Bhashyam Ramesh, Secunderabad (IN); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 312 days.

(21) Appl. No.: 12/969,795

(22) Filed: Dec. 16, 2010

(51) Int. Cl.
 *G06F 17/30* (2006.01)

(52) U.S. Cl.
 CPC .... *G06F 17/30551* (2013.01); *G06F 17/30548* (2013.01)
 USPC .......... 707/703; 707/725; 707/746; 707/689; 707/787; 707/790

(58) Field of Classification Search
 CPC ...................... G06F 17/30551; G06F 17/30548
 USPC .......................................................... 707/746
 See application file for complete search history.

(56) References Cited

U.S. PATENT DOCUMENTS

| | | | | |
|---|---|---|---|---|
| 5,440,730 | A * | 8/1995 | Elmasri et al. .................... | 1/1 |
| 5,950,210 | A * | 9/1999 | Nelson ................................ | 1/1 |
| 6,185,556 | B1 * | 2/2001 | Snodgrass et al. ............ | 707/687 |
| 6,324,535 | B1 * | 11/2001 | Bair et al. ...................... | 707/769 |
| 6,442,543 | B1 * | 8/2002 | Snodgrass et al. ................... | 1/1 |
| 6,983,275 | B2 * | 1/2006 | Koo et al. ............................. | 1/1 |
| 7,346,628 | B2 * | 3/2008 | Porter ................................. | 1/1 |
| 2004/0139116 | A1 * | 7/2004 | Porter ........................ | 707/104.1 |
| 2006/0136481 | A1 * | 6/2006 | Dehn et al. .................... | 707/102 |
| 2007/0050429 | A1 * | 3/2007 | Goldring et al. .............. | 707/203 |
| 2009/0248638 | A1 * | 10/2009 | Hughes ............................. | 707/3 |
| 2009/0248718 | A1 * | 10/2009 | Hughes ........................ | 707/100 |
| 2009/0248727 | A1 * | 10/2009 | Hughes ........................ | 707/101 |

OTHER PUBLICATIONS

Elmasri et al., A Temporal Model and Query Language for ER Databases, IEEE 1990.*
Gunhadi et al., Query Processing Algorithms for Temporal Intersection Joins, IEEE 1991.*
Leung et al., Generalized Data Stream Indexing and Temporal Query Processing, IEEE 1992.*
Snodgrass, Aggregates in the Temporal Query Language Tquel, IEEE 1993.*

* cited by examiner

*Primary Examiner* — Neveen Abel Jalil
*Assistant Examiner* — Kristofer Biskeborn
(74) *Attorney, Agent, or Firm* — Howard Speight

(57) ABSTRACT

A SEQUENCED request a) to apply a temporal Source table to a temporal Target table under a predicate is received. The Source table includes a plurality of rows that qualify to apply to a single Target table row under the predicate. The predicate specifies a Source table join column. Each of the plurality of Source table rows and the single Target table row include a ValidTime dimension. The plurality of Source table rows is b) ordered by the Source table join column and a period-to-be-modified. The next of the ordered plurality of Source table rows is c) applied by determining that the Target table row has a TransactionTime and, in response, closing out the TransactionTime of the Target table row. Applying the next of the ordered plurality of Source table rows includes identifying an RDIFF range as the period-to-be-modified of the Source table row being applied that is later than the ValidTime range of the single Target table row. Applying the next of the ordered plurality of Source table rows includes creating an RDIFF row being the same as the Target table row except the ValidTime of the RDIFF row is set to RDIFF range. A second of the ordered plurality of Source table rows d) is applied by applying c) to the RDIFF row as the Target table row.

20 Claims, 5 Drawing Sheets

SEQUENCED MODIFICATIONS OF MULTIPLE ROWS IN A TEMPORAL TABLE

BACKGROUND

An UPDATE or DELETE statement in Structured Query Language ("SQL") in which multiple source rows affect the same target row in a nontemporal table can be optimized by removing duplicate source rows. Optimizing such an operation with a temporal table is a challenge.

SUMMARY

In general, in one aspect, the invention features a method. The method includes a) receiving a SEQUENCED request to apply a temporal Source table to a temporal Target table under a predicate. The Source table includes a plurality of rows that qualify to apply to a single Target table row under the predicate. The predicate specifies a Source table join column. Each of the plurality of Source table rows and the single Target table row include a ValidTime dimension. The method further includes b) ordering the plurality of Source table rows by the Source table join column and a period-to-be-modified. The method further includes c) applying the next of the ordered plurality of Source table rows by determining that the Target table row has a TransactionTime and, in response, closing out the TransactionTime of the Target table row. Applying the next of the ordered plurality of Source table rows includes identifying an RDIFF range as the period-to-be-modified of the Source table row being applied that is later than the ValidTime range of the single Target table row. Applying the next of the ordered plurality of Source table rows includes creating an RDIFF row being the same as the Target table row except the ValidTime of the RDIFF row is set to RDIFF range. The method further includes d) applying a second of the ordered plurality of Source table rows by applying c) to the RDIFF row as the Target table row.

Implementations of the invention may include one or more of the following. The SEQUENCED request may be a SEQUENCED DELETE. The SEQUENCED request may be a SEQUENCED UPDATE. Applying the one of the plurality of Source table rows at a TransactionTime t1 may further include creating a new Target table row by applying the Source table row to the Target table row using the predicate. The method may further include recognizing the RDIFF row as the Target table row. The method may further include determining that a beginning of the period-to-be-modified of the next one of the ordered plurality of Source table rows is earlier than a beginning of the ValidTime range of the Target table row. The method may further include reporting a multiple source row error. The period-to-be-modified may be one of a group of periods consisting of (a) a range of the ValidTime of the Source table row, (b) a logical intersection of ranges of the ValidTime of the Source table row and the PA (c) a logical intersection of ranges of the ValidTime of the Source table row, the PA, and the ValidTime of the Target table row. The method may further include saving the RDIFF row in the Target table. Applying the first of the ordered plurality of Source table rows at a TransactionTime t1 may further include identifying an LDIFF range as the period-to-be-modified of the Source table row being applied that is earlier than the ValidTime range of the Target table row. Applying the first of the ordered plurality of Source table rows at a TransactionTime t1 may further include creating a new LDIFF row in the Target table being the same as the Target table row except a ValidTime of the LDIFF row is set to the LDIFF range.

In general, in another aspect, the invention features a database system. The database system includes one or more nodes. The database system further includes a plurality of CPUs. Each of the one or more nodes provides access to one or more CPUs. The database system further includes a plurality of virtual processes. Each of the one or more CPUs provides access to one or more virtual processes. Each virtual process is configured to manage data, including rows from the set of database table rows, stored in one of a plurality of data-storage facilities. The database system further includes a process. The process a) receives a SEQUENCED request to apply a temporal Source table to a temporal Target table under a predicate. The Source table includes a plurality of rows that qualify to apply to a single Target table row under the predicate. The predicate specifies a Source table join column. Each of the plurality of Source table rows and the single Target table row include a ValidTime dimension. The process b) orders the plurality of Source table rows by the Source table join column and a period-to-be-modified. The process c) applies the next of the ordered plurality of Source table rows by determining that the Target table row has a TransactionTime and, in response, closing out the TransactionTime of the Target table row. Applying the next of the ordered plurality of Source table rows further includes identifying an RDIFF range as the period-to-be-modified of the Source table row being applied that is later than the ValidTime range of the single Target table row. Applying the next of the ordered plurality of Source table rows further includes creating an RDIFF row being the same as the Target table row except the ValidTime of the RDIFF row is set to RDIFF range. The process d) applies a second of the ordered plurality of Source table rows by applying c) to the RDIFF row as the Target table row.

In general, in another aspect, the invention features a computer program, stored in a computer-readable tangible medium. The program includes executable instructions that cause a computer to a) receive a SEQUENCED request to apply a temporal Source table to a temporal Target table under a predicate. The Source table includes a plurality of rows that qualify to apply to a single Target table row under the predicate. The predicate specifies a Source table join column. Each of the plurality of Source table rows and the single Target table row include a ValidTime dimension. The program further includes executable instructions that cause the computer to b) order the plurality of Source table rows by the Source table join column and a period-to-be-modified. The program further includes executable instructions that cause the computer to c) apply the next of the ordered plurality of Source table rows by determining that the Target table row has a TransactionTime and, in response, closing out the TransactionTime of the Target table row. When applying the next of the ordered plurality of Source table rows, the computer identifies an RDIFF range as the period-to-be-modified of the Source table row being applied that is later than the ValidTime range of the single Target table row. When applying the next of the ordered plurality of Source table rows, the computer creates an RDIFF row being the same as the Target table row except the ValidTime of the RDIFF row is set to RDIFF range. The program further includes executable instructions that cause the computer to d) apply a second of the ordered plurality of Source table rows by applying c) to the RDIFF row as the Target table row.

DETAILED DESCRIPTION

Figure 1:
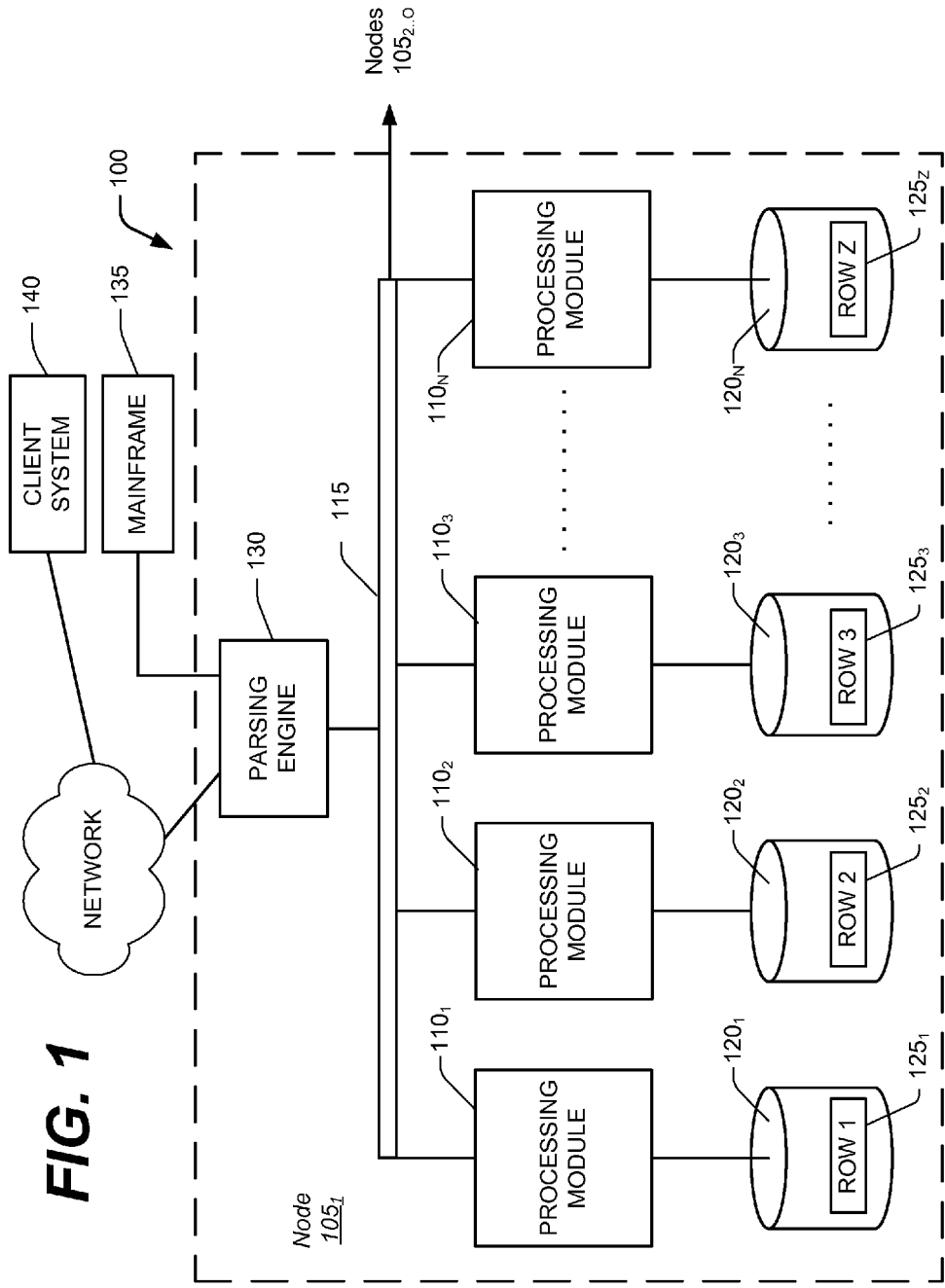
FIG. 1 is one example of a block diagram of a node of a database system.
Figure 2:
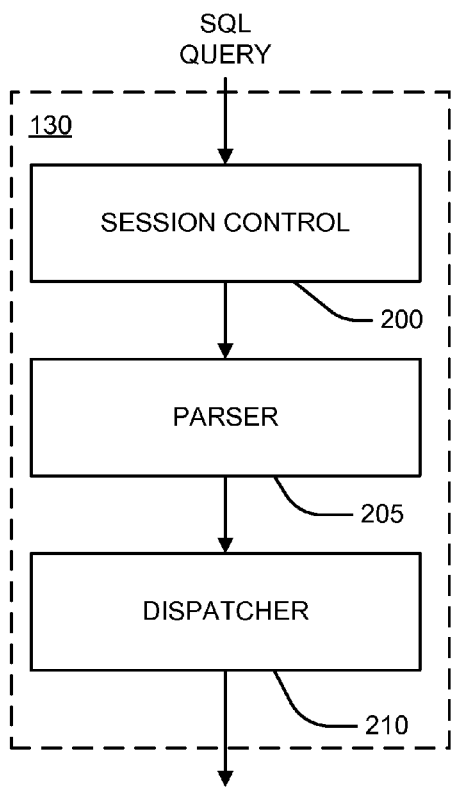
FIG. 2 is one example of a block diagram of a parsing engine.

The technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 3:
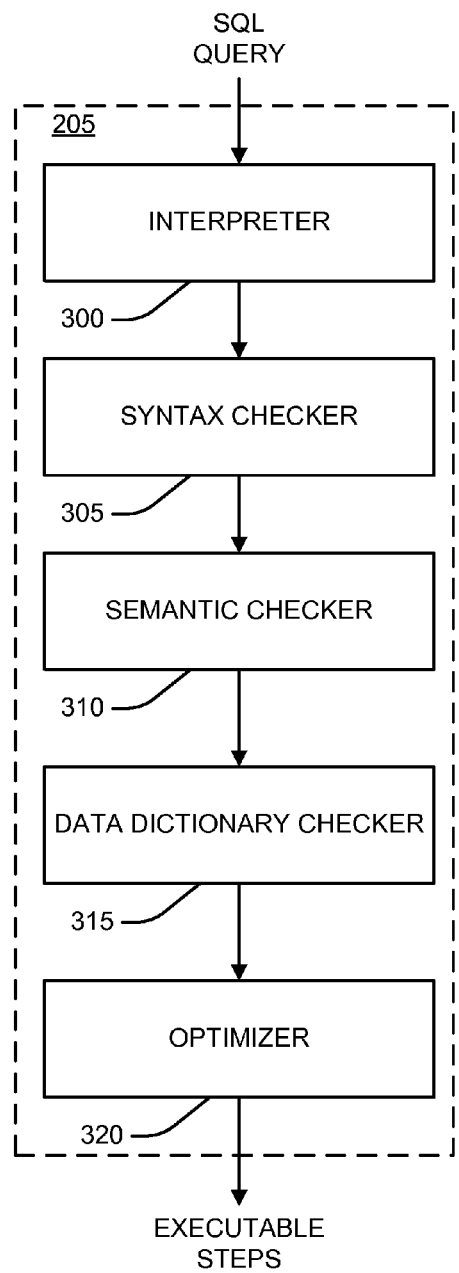
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_1 \ldots N$ to implement the executable steps.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, it stores an inventory history or the movement of employees within an organization. While a conventional database can maintain temporal data, it is typically done using user-defined date or timestamp columns, or the like, which are maintained in a temporal manner with manual coding for data maintenance activities.

In one embodiment, there are three different fundamental kinds of time in a temporal database. The first type is user-defined times that are un-interpreted time values. Such times typically are defined as DateTime data types or Period data types.

In one embodiment, as is conventional, DateTime and Period data types are intrinsic types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time. Indeed, a table can have an arbitrary number of user-defined times that may have meanings to the database, upstream source systems and/or processes, etc.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

In a nontemporal table, if multiple source rows update the same target row an error is reported. For temporal updates it is possible the multiple source rows have non-overlapping period of validity ("PV"). In such a case it should not be an error—rather the UPDATE or DELETE should modify the applicable source PV portion.

Sequenced Update

In one embodiment, a SEQUENCED UPDATE reports an error if (a) multiple source rows modify the same target row and (b) the PVs of the source rows overlap. In one embodiment, a SEQUENCED UPDATE does not report an error if (b) is not satisfied, i.e. if the source PV do not overlap. In one embodiment, if the source PV do not overlap then the modification happens in the target on the corresponding PV portion from the source.

For example, assume target and source table are:

TABLE 1

| Target | | | |
| --- | --- | --- | --- |
| c1 | c2 | VT | TT |
| 1 | 1 | t1-t5 | t1-UC |

TABLE 2

| Source | | | |
| --- | --- | --- | --- |
| x1 | x2 | VT | TT |
| 1 | 1 | t2-t3 | t1-UC |
| 1 | 2 | t3-t4 | t1-UC | where VT is ValidTime, TT is TransactionTime, t1 is earlier than t2, which is earlier than t3, which is earlier than t4, etc., and UC is the end of time (or a time far in the future, such as Dec. 31, 9999).

In one embodiment, Table.c1 is a ROWID column and Source.x1 identifies the ROWID of the Target table row to be modified by the Source table row. In the example, there is only one Target table row and both Source table rows are to update that Target table row, as indicated by the match between the value of Source.x1 in both rows to the value of Target.c1. It will be understood that this technique is not limited to such an arrangement. For example, Target.c1 may not be a ROWID column but may instead contain other data.

In one embodiment, an error is reported if there is an overlap in the ValidTime values of multiple rows in the Source table. For example if the ValidTime of the second row of the Source table was "t2-t4" instead of "t3-t4" an error would be reported because the ValidTime of the second row overlaps that of the first row (i.e., "t2-t4" overlaps "t2-t3").

In one embodiment, the beginning element and the ending element of the ValidTime dimension are defined in such a way that ValidTime ranges of the first and second row of the Source table in Table 2 are not overlapping. In one embodiment, the beginning element and ending element are defined such that the range is: beginning_element<ValidTime<=ending_element. With that definition, the ValidTime range of the first row of the Source table is t2<ValidTime<=t3 and the ValidTime range of the second row of the Source table is t3<ValidTime<=t4. Under this definition, the ValidTime ranges of the first and second row MEET. That is, they completely cover a contiguous time period (t2<ValidTime<=t4) without gaps and without overlapping. It will be understood that other definitions of the beginning element and the ending element of ValidTime are possible (e.g., beginning_element<=ValidTime<ending_element).

Assume a SEQUENCED UPDATE as follows:

SEQUENCED VALIDTIME

UPDATE Target

FROM Source

SET c2=c2+x2

WHERE c1=x1;

In one embodiment, the Source table is sorted on the join column and a "portion-to-be-modified" at the beginning of processing. In the SEQUENCED UPDATE shown above, the join column is x1.

In one embodiment, a Period of Applicability ("PA") can be optionally specified by a user to indicate the period of interest for the modification.

In one embodiment the "portion-to-be-modified" is the intersection of the Source ValidTime range and the PA. For example, if the Source ValidTime range is t1-t3 and the PA is t2-t4, with t1<t2<t3<t4, the portion-to-be-modified is t2-t3, which is the intersection of the Source ValidTime range and the PA.

In one embodiment in which a PA is not specified, the portion-to-be-modified is the Source ValidTime.

In one embodiment, the portion-to-be-modified is the intersection of the Source ValidTime, the PA, and the Target ValidTime. For example, if the Source ValidTime range is t1-t4, the PA is t2-t5, and the Target ValidTime range is t3-t6, with t1<t2<t3<t4<t5<t6, the portion-to-be-modified is t3-t4, which is the intersection of the Source ValidTime range, the PA and the Target ValidTime range.

In one embodiment, an intersection of two ranges takes into account the inequality definition of the ranges being intersected. For example, if a first ValidTime range is t1<ValidTime<=t3 and a second ValidTime range is t1<ValidTime<=t2, the intersection of the two ranges is t1<ValidTime<=t2. That is, ValidTime=t1 is not included in the intersection.

In one embodiment, sorting the Source table rows on the portion-to-be-modified involves sorting the Source table rows on the beginning_element of the portion-to-be-modified.

In the example of the Source table shown in Table 2, the Source table has already been sorted. In one embodiment, considering only the Source table ValidTime, the portion-to-be-modified is t2-t3 for the first row and t3-t4 for the second row. In one embodiment, considering the intersection of the Source ValidTime and the Target ValidTime, the portion-to-be-modified is the same (i.e., t2-t3 for the first row and t3-t4 for the second row) because the Target ValidTime range completely spans the ValidTime range for both of rows of the Source table. In this example, PA is assumed to be infinite (i.e., the user did not exercise the option to set a PA).

In one embodiment, the result in Target after an update using first source row at TT_TIMESTAMP of t10 is as follows:

TABLE 3

Target after update using first row of Source

| c1 | c2 | VT | TT |
|----|----|-------|--------|
| 1 | 1 | t1-t5 | t1-t10 |
| 1 | 1 | t1-t2 | t10-UC |
| 1 | 2 | t2-t3 | t10-UC |
| 1 | 1 | t3-t5 | t10-UC |

The first row is the same as the original row in Target except that the TransactionTime has been truncated to end at t10.

Figure 4:
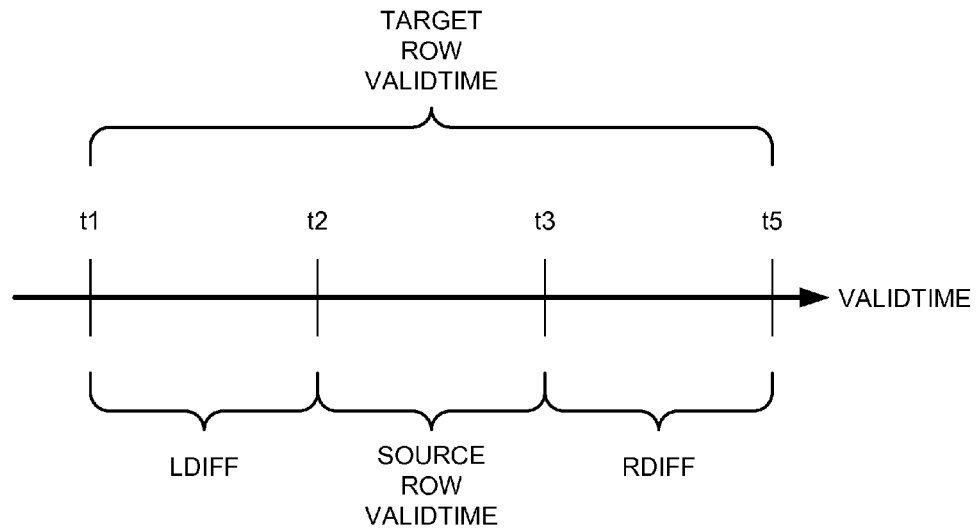
FIGS. 4 and 5 illustrate the concepts of LDIFF and RDIFF.

The second row is the LDIFF row and the last row is the RDIFF row. The concept of LDIFF and RDIFF is illustrated in FIG. 4 using the example of the original Target row from Table 1 and the first Source row from Table 2. In that example, the Target row's ValidTime range, from t1 to t5, straddles the first Source row's ValidTime range, from t2-t3, as shown in FIG. 4. LDIFF is the portion of the Target row's ValidTime range that is earlier than the Source row's ValidTime range. RDIFF is the portion of the Target row's ValidTime range that is later in time than the Source row's ValidTime range.

The SET clause is not executed for the LDIFF and RDIFF rows but the ValidTime for each row is set to the ValidTime for the LDIFF and the RDIFF, respectively. In particular, for the example above, the ValidTime of the LDIFF row is set to the LDIFF ValidTime shown in FIG. 4 and the ValidTime of the RDIFF row is set to the RDIFF ValidTime shown in FIG. 4.

Assuming the Source table is sorted on the portions to update, as it is in the example, the next matching source row will operate on this RDIFF portion only.

The result in Target after the update using second Source row at TT_TIMESTAMP of t10.1 will be as follows:

TABLE 4

Target after update using second row of Source

| c1 | c2 | VT | TT |
|----|----|-------|----------|
| 1 | 1 | t1-t5 | t1-t10 |
| 1 | 1 | t1-t2 | t10-UC |
| 1 | 2 | t2-t3 | t10-UC |
| 1 | 1 | t3-t5 | t10-t10.1 |
| 1 | 3 | t3-t4 | t10.1-UC |
| 1 | 1 | t4-t5 | t10.1-UC |

Figure 5:
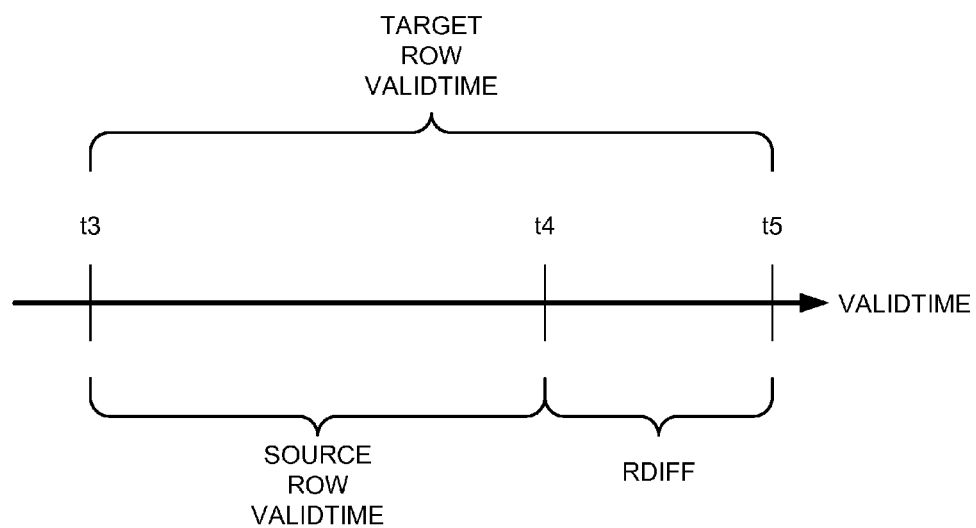

The first three rows of Table 4 are the same as the first three rows of Table 4, because, as mentioned above, the second Source row is only applied to the last row of Table 3 (the RDIFF row). The LDIFF/RDIFF situation for the application of the second Source row to the RDIFF row in Table 3 is shown in FIG. 5. There is no LDIFF and the RDIFF extends from t4-t5.

The fourth row of Table 4 is the RDIFF row from table 3 with TransactionTime truncated to the period from t10-t10.1.

The fifth row of Table 4 shows the application of the SET clause in the UPDATE and is limited to t3-t4, which is the ValidTime of the second row of the Source table.

The sixth row is the new RDIFF row to which the SET clause was not applied and has the RDIFF ValidTime shown in FIG. 5.

Sequenced Delete

In one embodiment, a SEQUENCED DELETE will not report an error even if multiple source rows match the same target row. This is like a nontemporal delete where multiple source rows delete the same target row. The following cases can occur: (a) multiple source rows have overlapping PVs—in this case the portion to delete is the union of the PVs of the source rows, and (b) multiple source rows are non-overlapping—in this case the there are multiple portions to delete in the target. Notice that the delete semantic is repeatedly applied when (b) occurs including tracking in TT dimension.

For example, assume the Target table and Source table are:

TABLE 5

Target

| c1 | c2 | VT | TT |
|----|----|-------|-------|
| 1 | 1 | t1-t5 | t1-UC |

TABLE 6

Source

| x1 | x2 | VT | TT |
|----|----|-------|-------|
| 1 | 1 | t2-t3 | t1-UC |
| 1 | 2 | t3-t4 | t1-UC |

Assume a SEQUENCED DELETE as follows:
SEQUENCED VALIDTIME
DELETE Target
FROM Source
WHERE c1=x1;

In one embodiment, Target.c1 is a ROWID column and Source.x1 identifies the Target table row to be modified. In one embodiment, Target.c1 is not a ROWID column but instead contains another type of data.

In one embodiment, the result in the Target table after delete using first source row at TT_TIMESTAMP of t10 is as follows:

TABLE 7

Target after UPDATE using first Source row

| c1 | c2 | ValidTime | TT |
|----|----|-----------|--------|
| 1 | 1 | t1-t5 | t1-t10 |
| 1 | 1 | t1-t2 | t10-UC |
| 1 | 1 | t3-t5 | t10-UC |

The first row is the in Table 7 is the original Target table row with its TransactionTime truncated to t1-t10. The second row shows the operation of the delete in that the ValidTime from t2-t3 has been deleted for TransactionTime from t10-UC. The last row is the RDIFF row. Assuming that source is sorted on the portions to delete, the next matching source row will operate on this RDIFF portion only.

The result in the Target table after the delete using the second source row at TT_TIMESTAMP of t10.1 will be as follows:

TABLE 8

Target after DELETE using second Source row

| c1 | c2 | ValidTime | TransactionTime |
|----|----|-----------|-----------------|
| 1 | 1 | t1-t5 | t1-t10 |
| 1 | 1 | t1-t2 | t10-UC |
| 1 | 1 | t3-t5 | t10-t10.1 |
| 1 | 1 | t4-t5 | t10.1-UC |

The first and second rows of Table 8 are the same as the first and second rows of table 7, for the reason mentioned above (i.e., the second source row only operates on the RDIFF portion of the table). The third row of Table 8 shows the operation of the delete in that the TransactionTime of the RDIFF portion of Table 7 has been truncated to t10-t10.1. The last row of Table 8 is the portion of the Target table unaffected by the delete.

Sequenced Update Processing Technique

Figure 6:
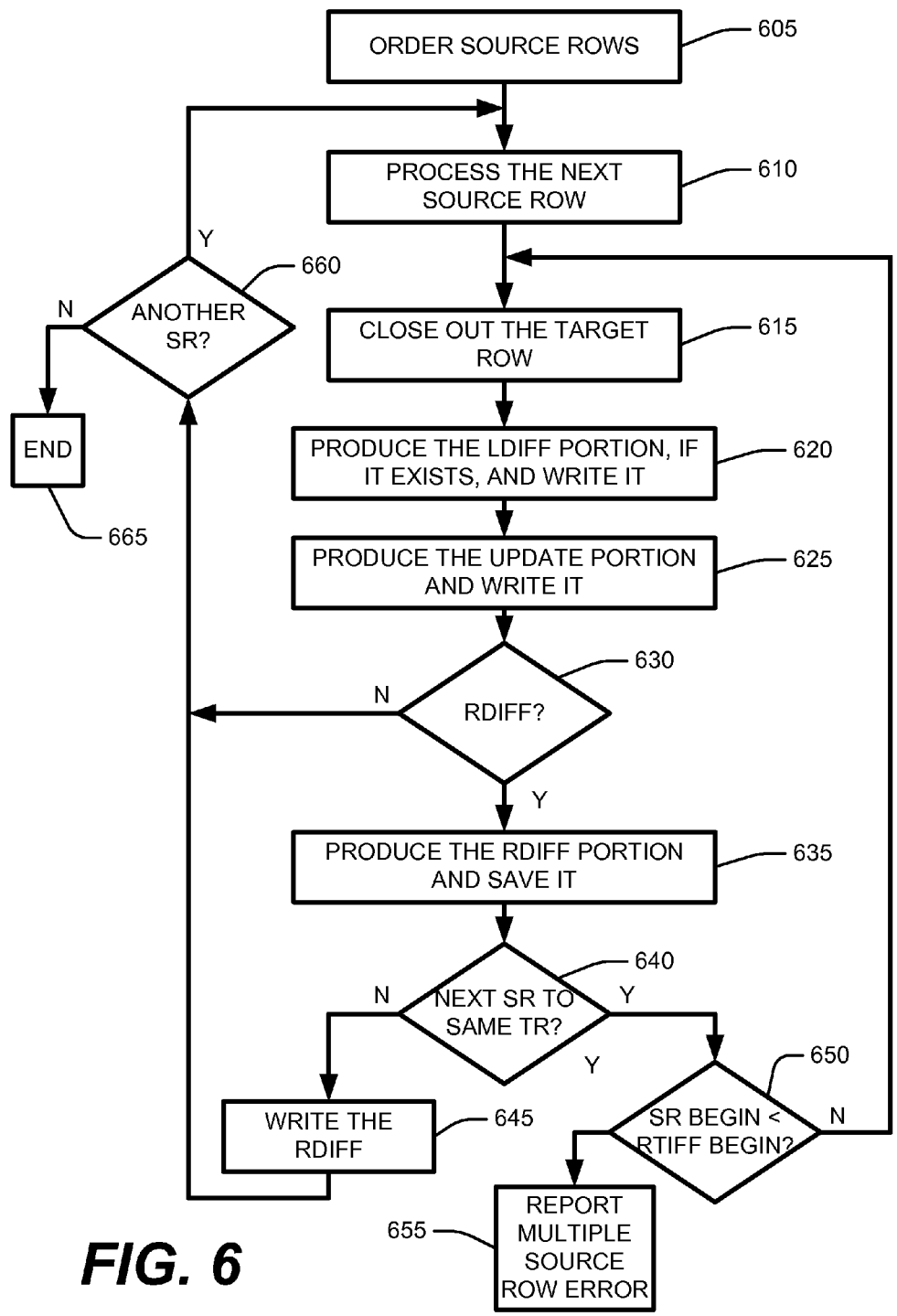
FIG. 6 is a flow chart for a SEQUENCED UPDATE.

One embodiment, illustrated in FIG. 6, of a technique for processing a SEQUENCED UPDATE, such as that illustrated above, to a temporal Target table from a temporal Source table in which the Source has multiple rows with non-overlapping PVs proceeds as follows:

1) Order the rows in the Source table by the join column (i.e, x1 in the example above) and the portion-to-be-modified, as discussed above (block 605). If there are multiple rows in the Source table having the same value in the join column, order those rows by the beginning of their respective portion-to-be-modified periods. Table 2 illustrates this. The rows in Table 2 are ordered by the join column value(s) (which in the example are the same and do not dictate order) and (because a PA has not been specified and the Target row ValidTime range spans the ValidTime ranges for both Source rows) the ValidTime value (i.e., the first row, in which ValidTime=t2–t3, precedes the second row, in which ValidTime=t3–t4). The ValidTime value for each row in the Source table will be the SET clause ValidTime field value when the UPDATE is executed.

2) Process the next source row (block 610). This involves applying the SET (i.e., SET c2=c2+x2) and WHERE (WHERE c1=x1) clauses of the UPDATE. As mentioned above, the ValidTime field value is set to that of the Source row being evaluated.

3) Close out the Target row (block 615). If the Target row has TransactionTime, the TransactionTime is closed at the time of the UPDATE. This is illustrated in Table 3, in which the TransactionTime of the first row, which previously was unbounded on the upper end, has been truncated to t10, the time of the transaction. Similarly, in Table 4, the TransactionTime of the RDIFF row from Table 3, which was unbounded on the upper end in Table 3, has been truncated to t10.1.

4) Produce the LDIFF portion if exists and write it (block 620). In Table 3, the result is the second row, in which the SET clause has not been executed (i.e., the values of c1 and c2 have not changed) and the ValidTime LDIFF ValidTime is as shown in FIG. 4. No further processing is needed on this row. There is no LDIFF portion in the processing of the application of the second Source row to the Target.

5) Produce the update portion and write it (block 625). In Table 3, the result is the third row. In table 4, the result is the fifth row. The SET clause has been executed, setting c2 to c2+x2, and the ValidTime has been set to the ValidTime of the source row. No further processing needed on these rows.

6) If an RDIFF portion exists (block 630), produce it and retain it (block 635). There is an RDIFF in Tables 3 and 4, as shown in FIGS. 4 and 5. In one embodiment, the RDIFF is not written to the Target table at this point because it may be subject to more processing, as discussed below. If there is no RDIFF, go to 2 (block 610).

7) If there is no next Source row or if the next Source row does not have the same join column value as the join column value in the RDIFF ("N" branch out of block 640), write the RDIFF portion (block 645). The RDIFF is saved but not written (although it is shown in Table 3 for illustrative purposes). There is no third Source table row, so the RDIFF is saved at the end of processing the second Source table row resulting in the fifth row of Table 4. In Table 3, the result is the fourth row and in Table 4, the result is the sixth row. No further processing is required. Go to processing of next row in element 2) (block 610).

8) If the next source row is on the same target row and the BEGIN of its ValidTime is less than the RDIFF ValidTime BEGIN value (block 650) then report multiple source row error (block 655).

9) Otherwise, go to 3) (block 615) using the RDIFF portion as the target row. In the example, processing would follow this path for the first Source table row.

10) Before processing another source row (block 610), determine if there is another source row (block 660) and, if there not, end the process (block 665).

Sequenced Delete Processing Technique

Figure 7:
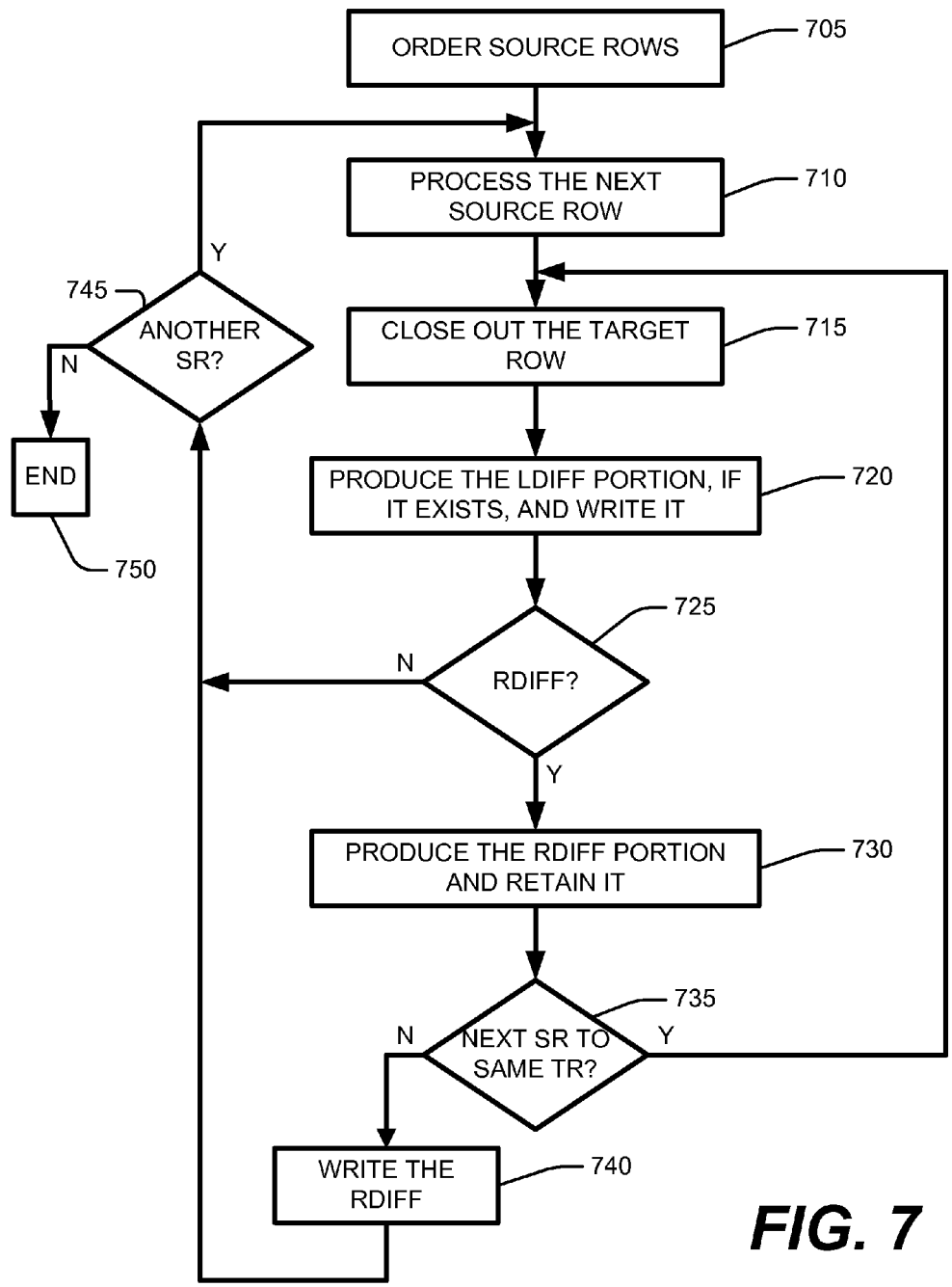
FIG. 7 is a flow chart for a SEQUENCED DELETE.

One embodiment, illustrated in FIG. 7, of a technique for processing SEQUENCED DELETEs for a Source table with multiple rows with non-overlapping PVs proceeds as follows:

1) Order the rows in the Source table by the join column (i.e., x1 in the example above) and the portion-to-be-modified, as discussed above (block 705). If there are multiple rows in the Source table having the same value in the join column, order those rows by the beginning of their respective portion-to-be-modified periods. Table 6 illustrates this. The rows in Table 6 are ordered by the join column values (which in the example are the same and do not dictate order) and (because a PA has not been specified and the Target row ValidTime range spans the ValidTime ranges for both Source rows) the ValidTime value (i.e., in Table 6 the first row in which ValidTime=t2–t3 precedes the second row in which ValidTime=t3–t4). The ValidTime value for each row in the Source table will be the SET clause ValidTime field value.

2) Process next source row (block 710). In the example, this involves applying the DELETE clause in the SEQUENCED DELETE example (DELETE Target FROM Source WHERE c1=x1).

3) Close out the target row (block 715). If the Target row has TransactionTime, the TransactionTime is closed at the time of the UPDATE. This is illustrated in Table 7, in which the TransactionTime of the first row, which previously was unbounded on the upper end, has been truncated to t10, the time of the transaction. Similarly, in Table 8, the TransactionTime of the RDIFF row from Table 7, which was previously unbounded on the upper end, has been truncated to t10.1, producing the third row of Table 8.

4) Produce the LDIFF portion if exists and write it (block 720). In Table 7, the result is the second row, in which the DELETE clause has not been executed and the ValidTime time reflects that portion of the Target row's ValidTime before the ValidTime of the Source row being evaluated. There is no LDIFF for the application of the second Source row to the Target, as shown in FIG. 5. No further processing is needed on this row.

5) If an RDIFF portion exists (block 725), produce it and retain it (block 730). In one embodiment, the RDIFF is not written to the Target table at this point because it may be subject to more processing, as discussed below. If there is no RDIFF, go to 2 (block 710).

6) If there is no next Source row or if the next Source row does not have the same join column value as the join column value in the RDIFF (block 735) write the RDIFF portion (block 740). No further processing is required.

Go to processing of next row in step 2 (block 710). In the example, this is the path that is followed for the second Source table row.

7) If the next Source row is on the same Target row then go to 3 (block 715) using the RDIFF portion as the target row. In the example, this is the path that is followed for the first Source table row.

8) Before processing another source row (block 710), determine if there is another source row (block 745) and, if not, end the process (block 750).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   receiving a SEQUENCED request to apply a temporal Source table to a temporal Target table under a predicate, the Source table including a plurality of rows that qualify to apply to a single Target table row under the predicate, the predicate specifying a Source table join column, each of the plurality of Source table rows and the single Target table row including a ValidTime dimension;
   ordering the plurality of Source table rows by the Source table join column and a period-to-be-modified;
   applying the next of the ordered plurality of Source table rows by:
      determining that the Target table row has a TransactionTime and, in response, closing out the TransactionTime of the Target table row;
      identifying an RDIFF range as the period-to-be-modified of the Source table row being applied that is entirely later than the ValidTime range of the single Target table row;
      creating an RDIFF row being the same as the Target table row except the ValidTime of the RDIFF row is set to RDIFF range;
   applying a second of the ordered plurality of Source table rows by applying the determining, identifying, and creating steps to the RDIFF row as the Target table row.

2. The method of claim 1 wherein:
   the SEQUENCED request is a SEQUENCED DELETE.

3. The method of claim 1 wherein:
   the SEQUENCED request is a SEQUENCED UPDATE; and
   applying the one of the plurality of Source table rows at a TransactionTime t1 further comprises:
   creating a new Target table row by applying the Source table row to the Target table row using the predicate.

4. The method of claim 1 further comprising:
   recognizing the RDIFF row as the Target table row;
   determining that a beginning of the period-to-be-modified of the next one of the ordered plurality of Source table rows is earlier than a beginning of the ValidTime range of the Target table row; and
   reporting a multiple source row error.

5. The method of claim 1 wherein:
   the period-to-be-modified is one of a group of periods consisting of: a range of the ValidTime of the Source table row, a logical intersection of ranges of the ValidTime of the Source table row and the PA, and a logical intersection of ranges of the ValidTime of the Source table row, the PA, and the ValidTime of the Target table row.

6. The method of claim 1 further comprising:
   saving the RDIFF row in the Target table.

7. The method of claim 1 wherein applying the first of the ordered plurality of Source table rows at a TransactionTime t1 further comprises:
   identifying an LDIFF range as the period-to-be-modified of the Source table row being applied that is earlier than the ValidTime range of the Target table row; and
   creating a new LDIFF row in the Target table being the same as the Target table row except a ValidTime of the LDIFF row is set to the LDIFF range.

8. A database system comprising:
   one or more nodes;
   a plurality of processors, each of the one or more nodes providing access to one or more processors;
   a plurality of virtual processes, each of the one or more processors providing access to one or more virtual processes;
   each virtual process configured to manage data, including rows from the set of database table rows, stored in one of a plurality of data-storage facilities;
   a process to:
      receive a SEQUENCED request to apply a temporal Source table to a temporal Target table under a predicate, the Source table including a plurality of rows that qualify to apply to a single Target table row under the predicate, the predicate specifying a Source table join column, each of the plurality of Source table rows and the single Target table row including a ValidTime dimension;
      order the plurality of Source table rows by the Source table join column and a period-to-be-modified;
      apply the next of the ordered plurality of Source table rows by:
         determining that the Target table row has a TransactionTime and, in response, closing out the TransactionTime of the Target table row;
         identifying an RDIFF range as the period-to-be-modified of the Source table row being applied that is entirely later than the ValidTime range of the single Target table row;
         creating an RDIFF row being the same as the Target table row except the ValidTime of the RDIFF row is set to RDIFF range;
      apply a second of the ordered plurality of Source table rows by applying the determining, identifying, and creating steps to the RDIFF row as the Target table row.

9. The database system of claim 8 wherein:
   the SEQUENCED request is a SEQUENCED DELETE.

10. The database system of claim 8 wherein:
    the SEQUENCED request is a SEQUENCED UPDATE; and
    applying the one of the plurality of Source table rows at a TransactionTime t1 further comprises:
    creating a new Target table row by applying the Source table row to the Target table row using the predicate.

11. The database system of claim 8 further comprising:
    recognizing the RDIFF row as the Target table row;
    determining that a beginning of the period-to-be-modified of the next one of the ordered plurality of Source table rows is earlier than a beginning of the ValidTime range of the Target table row; and
    reporting a multiple source row error.

12. The database system of claim 8 wherein:
the period-to-be-modified is one of a group of periods consisting of: a range of the ValidTime of the Source table row, a logical intersection of ranges of the ValidTime of the Source table row and the PA, and a logical intersection of ranges of the ValidTime of the Source table row, the PA, and the ValidTime of the Target table row.

13. The database system of claim 8 further comprising: saving the RDIFF row in the Target table.

14. The database system of claim 8 wherein applying the first of the ordered plurality of Source table rows at a TransactionTime t1 further comprises:
identifying an LDIFF range as the period-to-be-modified of the Source table row being applied that is earlier than the ValidTime range of the Target table row; and
creating a new LDIFF row in the Target table being the same as the Target table row except a ValidTime of the LDIFF row is set to the LDIFF range.

15. A computer program, stored in a non-transitory computer-readable tangible medium, the program comprising executable instructions that cause a computer to:
receive a SEQUENCED request to apply a temporal Source table to a temporal Target table under a predicate, the Source table including a plurality of rows that qualify to apply to a single Target table row under the predicate, the predicate specifying a Source table join column, each of the plurality of Source table rows and the single Target table row including a ValidTime dimension;
order the plurality of Source table rows by the Source table join column and a period-to-be-modified;
apply the next of the ordered plurality of Source table rows by:
determining that the Target table row has a TransactionTime and, in response, closing out the TransactionTime of the Target table row;
identifying an RDIFF range as the period-to-be-modified of the Source table row being applied that is entirely later than the ValidTime range of the single Target table row;
creating an RDIFF row being the same as the Target table row except the ValidTime of the RDIFF row is set to RDIFF range;
apply a second of the ordered plurality of Source table rows by applying the determining, identifying, and creating steps to the RDIFF row as the Target table row.

16. The computer program of claim 15 wherein:
the SEQUENCED request is a SEQUENCED UPDATE; and
applying the one of the plurality of Source table rows at a TransactionTime t1 further comprises:
creating a new Target table row by applying the Source table row to the Target table row using the predicate.

17. The computer program of claim 15 further comprising executable instructions that cause the computer to:
recognize the RDIFF row as the Target table row;
determine that a beginning of the period-to-be-modified of the next one of the ordered plurality of Source table rows is earlier than a beginning of the ValidTime range of the Target table row; and
report a multiple source row error.

18. The computer program of claim 15 wherein:
the period-to-be-modified is one of a group of periods consisting of a range of the ValidTime of the Source table row, a logical intersection of ranges of the ValidTime of the Source table row and the PA, and a logical intersection of ranges of the ValidTime of the Source table row, the PA, and the ValidTime of the Target table row.

19. The computer program of claim 15 further comprising: saving the RDIFF row in the Target table.

20. The computer program of claim 15 wherein applying the first of the ordered plurality of Source table rows at a TransactionTime t1 further comprises:
identifying an LDIFF range as the period-to-be-modified of the Source table row being applied that is earlier than the ValidTime range of the Target table row; and
creating a new LDIFF row in the Target table being the same as the Target table row except a ValidTime of the LDIFF row is set to the LDIFF range.

* * * * *